United States Patent
Onishi

(12) United States Patent (10) Patent No.: US 7,113,678 B1
Onishi (45) Date of Patent: Sep. 26, 2006

(54) DETECTOR DETECTING TRANSMISSION PERFORMANCE OF OPTICAL COMPOSITE CABLE

(75) Inventor: Satoru Onishi, Aichi-ken (JP)

(73) Assignee: Canare Electric Co., Ltd., Aichi-Ken (JP)

( * ) Notice: Subject to any disclaimer, the term of this patent is extended or adjusted under 35 U.S.C. 154(b) by 0 days.

(21) Appl. No.: 11/272,782

(22) Filed: Nov. 15, 2005

(30) Foreign Application Priority Data

Mar. 24, 2005 (JP) .............................. 2005-086710

(51) Int. Cl.
*G02B 6/44* (2006.01)

(52) U.S. Cl. .................. 385/101; 398/20; 240/531; 240/555

(58) Field of Classification Search .................. None
See application file for complete search history.

(56) References Cited

U.S. PATENT DOCUMENTS 6,110,107 A * 8/2000 Bellahsene et al. ......... 600/182
6,373,262 B1 * 4/2002 Herring et al. ............. 324/647
2005/0053340 A1 * 3/2005 Toriumi et al. ............. 385/101

* cited by examiner

*Primary Examiner*—Michelle Connelly-Cushwa
*Assistant Examiner*—Rhonda S. Peace
(74) *Attorney, Agent, or Firm*—McGinn Intellectual Property Law Group, PLLC

(57) ABSTRACT

The detector comprises a loopback unit 10 which is connected to a connector formed at one end of an optical camera cable, an optical loop fiber 11 connecting a first optical fiber 31 and a second optical fiber 32, and a short-circuit wiring 12 which short-circuits plural electric lines of the optical camera cable. The detector also comprises a measuring unit 40 comprising a transmission loss measuring part which is connected to a connector formed at the other end of the optical camera cable and measures transmission loss between the first optical fiber and the second optical fiber, a resistivity measuring part which measures resistivity between electric lines, a disconnection detecting part which detects connection or disconnection of electric lines by using measured resistivity, and a display part, which displays the result of transmission loss measured by the transmission loss measuring part and connection or disconnection detected by the disconnection detecting part.

4 Claims, 3 Drawing Sheets

FIG. 2A
FIG. 2B
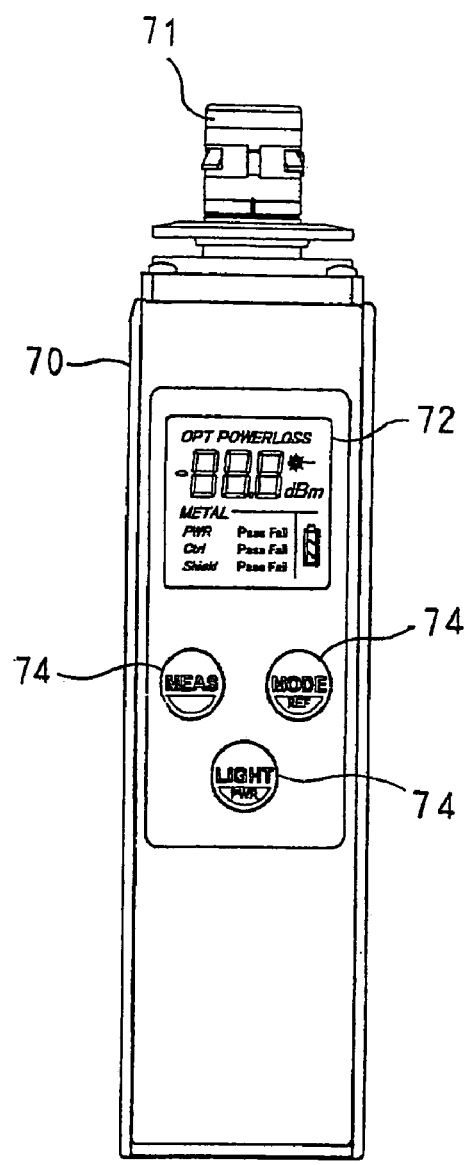
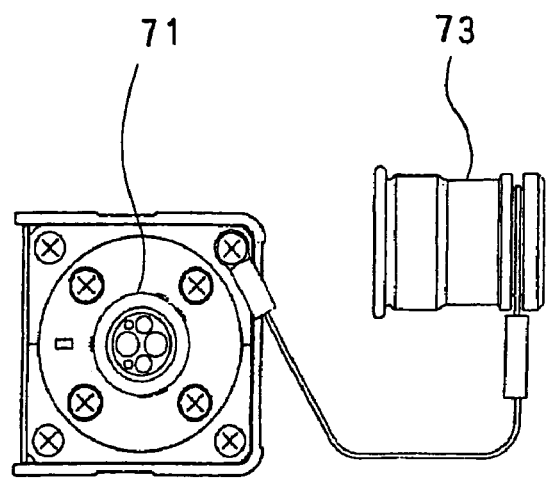

FIG. 3A
FIG. 3B
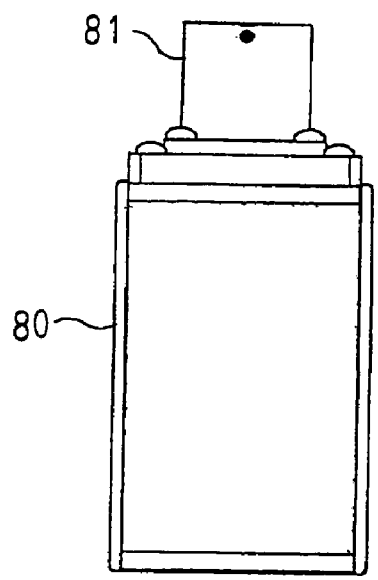
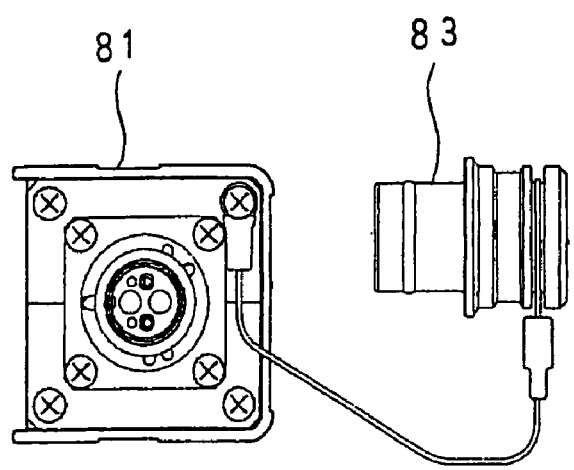

DETECTOR DETECTING TRANSMISSION PERFORMANCE OF OPTICAL COMPOSITE CABLE

This is a patent application based on a Japanese patent application No. 2005-86710 which was filed on Mar. 24, 2005, and which is incorporated herein by reference.

TECHNICAL FIELD

The present invention relates to a device which detects transmission status of an optical composite cable comprising optical fibers and electric lines. Mainly, the present invention relates to a device detecting disconnection and transmission loss of an optical fiber.

BACKGROUND ART

Conventionally, as shown in a patent document 1, i.e., Japanese Patent Application Laid-open No. 2000-59661, an optical composite cable for a TV camera which comprises a pair of optical fibers, a pair of signal lines, and a shield line, is a common and well-known example in order to control a TV camera. Image data and sound signals of a TV camera are transferred through optical fibers, control signals controlling the camera are transferred through signal lines, and electric power is supplied to the TV camera through power supply lines. This optical composite cable is used in the open air.

For example, in order to broadcast a golf game, it has been necessary to install cameras at a lot of spots of the course and to connect those cameras and a relay car by using a large number of conventional optical composite cables.

DISCLOSURE OF THE INVENTION

Problems to be Solved

In order to install optical composite cables outdoor, however, problems persist in disconnection of optical fibers and electric lines and increasing transmission loss owing to contamination of soiled connection ends of optical fibers and deterioration of the optical fibers and so on. So it has been necessary to connect a TV camera to the connection end of the optical composite cable to be installed from the relay car before broadcasting the game on TV to monitor operation and image quality of the camera. After checking one optical composite cable, the next optical composite cable is extended and then the TV camera has to be connected to the end of the extended cable to monitor the quality of the transmitted image. Accordingly, they need to move a heavy TV camera from one connection end of the optical composite cable to the other, and that bothers to check operation of each optical composite cable to be installed.

In order to solve the above-described problems, the present invention aims to detect transmission characteristic and transmission status such as disconnection of the optical composite cable more easily.

That is, a first aspect of the present invention is a detector detecting transmission performance of optical composite cable which comprises optical fibers and electric lines, comprising: a first unit, which is connected to a connector formed at one end of the optical composite cable and comprises a optical loop part connecting a first optical fiber and a second optical fiber and a short-circuit part which short-circuits plural electric lines in the optical composite cable; and a second unit comprising a transmission loss measuring part, which is connected to a connector formed at the other end of the optical composite cable and measures transmission loss between ends of the first optical fiber and the second optical fiber returned by the optical loop unit, a resistivity measuring part, which measures resistivity between ends of electric lines returned by the short-circuit part, a disconnection detecting part, which detects connection or disconnection of electric lines by using measured resistivity, and a display part, which displays the result of transmission loss measured by the transmission loss measuring part and connection or disconnection detected by the disconnection detecting part.

Here, numbers of the optical fibers and the electric lines constructing the optical composite cable may not be limited. Generally, the optical composite cable comprises a pair of optical fibers, a pair of electric signal lines (hereinafter simply referred to as signal lines), and a pair of electric power supply lines (hereinafter simply referred to as power supply lines). The electric line comprises a pair of electric signal lines and a pair of electric power supply lines. The first unit returns optical signal and electric signal transmitted from the second unit. The second unit transmits optical signal and electric signal, measures transmission loss between ends of returned optical fibers (hereinafter referred to as transmission loss between ends of optical fibers) and resistivity between ends of electric lines which are short-circuited at one end (hereinafter referred to as resistivity between ends of electric lines), and displays quantity of transmission loss and status of disconnection or trouble according to those measurement results.

A second aspect of the present invention is that the electric lines comprise a pair of signal lines and a pair of power supply lines and a shield line, the resistivity measuring part measures resistivity between ends of a pair of signal lines returned from the short-circuit part, resistivity between ends of a pair of power supply lines returned from the short-circuit part, and each resistivity between each ends of each signal line and a shield line returned from the short-circuit part, each resistivity between each end of each power supply line and the shield line returned from the short-circuit part, and the disconnection detecting part detects each disconnection status of the signal line, the electric line, and the shield line according to those measurement results.

When there are 5 electric lines, resistivities 6 in total are measured. The resistivities are: resistivity between ends of the signal lines returned from the first unit (hereinafter referred to as resistivity between ends of signal lines), resistivity between ends of the power supply lines returned from the first unit (hereinafter referred to as resistivity between ends of power supply lines), each resistivity between ends of each signal line and the shield line connected by the first unit (hereinafter referred to as resistivity between end of signal line and shield line), and each resistivity between ends of each power supply line and the shield line connected by the first unit (hereinafter referred to as resistivity between ends of power supply line and shield line). When resistivity between end of signal lines is larger than the predetermined value, the signal lines are judged to be disconnected. When resistivity between ends of power supply lines is larger than the predetermined value, the power supply lines are judged to be disconnected. Under condition that the power supply lines are normal, resistivity of the shield line is half a value of sum of two resistivity values between ends of each power supply lines and the shield line subtracted by resistivity value between ends of the power supply lines. When the power supply lines are broken and the signal lines are normal, resistivity of the shield line is half a value of sum of two resistivity values between ends of each signal line and the shield line subtracted by resistivity value between ends of the signal lines.

A third aspect of the present invention is that the transmission loss measuring part outputs a pulse optical signal to the first optical fiber and receives the pulse optical signal from the second optical fiber synchronizing with sending said pulse optical signal.

Outputting the optical signal as a pulse enables to save electric power consumption of the second unit.

Through employment of the aforementioned aspects of the present invention, the aforementioned drawbacks can be overcome effectively and rationally.

Effect of the Invention

Effects to be obtained by the present invention are explained as follows.

The first unit is connected to one end of the optical composite cable. Then other optical composite cables are connected in sequence to the other end of the optical composite cable by cascade connection, and the optical composite cables are extended. The second unit is connected to the other end of the extended optical composite cables, and the detector of the present invention detects the transmission performance of those connected optical composite cables. By carrying out these processes every time the optical composite cable is connected, it becomes possible to quickly know which one of the optical composite cables is broken.

Also, when the optical composite cables are connected to each other in used state, the first unit is connected to the end of one optical composite cable at the side the TV camera is connected, the second unit is connected to the connector of the optical composite cable which is installed at the farthest side from the first unit, and then transmission performance of the optical composite cable between each end is measured. Next, the optical composite cable is taken off at the farthest side from the first unit, the second unit is connected to the connector of the next optical composite cable in the transmission line which is installed at the farthest side from the first unit, and then transmission performance of that optical composite cable between each end is measured. By carrying out those processes toward the first unit repeatedly, it is detected which one of the optical composite cables has trouble.

Accordingly, only one of the second unit and the first unit connected to the optical composite cables may be shifted. That enables to detect troubles of transmission line using the optical composite cables extremely easier when the cables are installed in the field.

As a result, troubles in a transmission circuit comprising optical composite cables which is employed to connect TV cameras to telecast from outdoor can be detected more easily.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings, in which:

FIGS. 2A and 2B are views showing mechanical structure of a measure unit of the detector according to the embodiment of the present invention; and FIGS. 3A and 3B are views showing mechanical structure of a loopback unit of the detector according to the embodiment of the present invention.

BEST MODE FOR CARRYING OUT THE INVENTION

Figure 1:
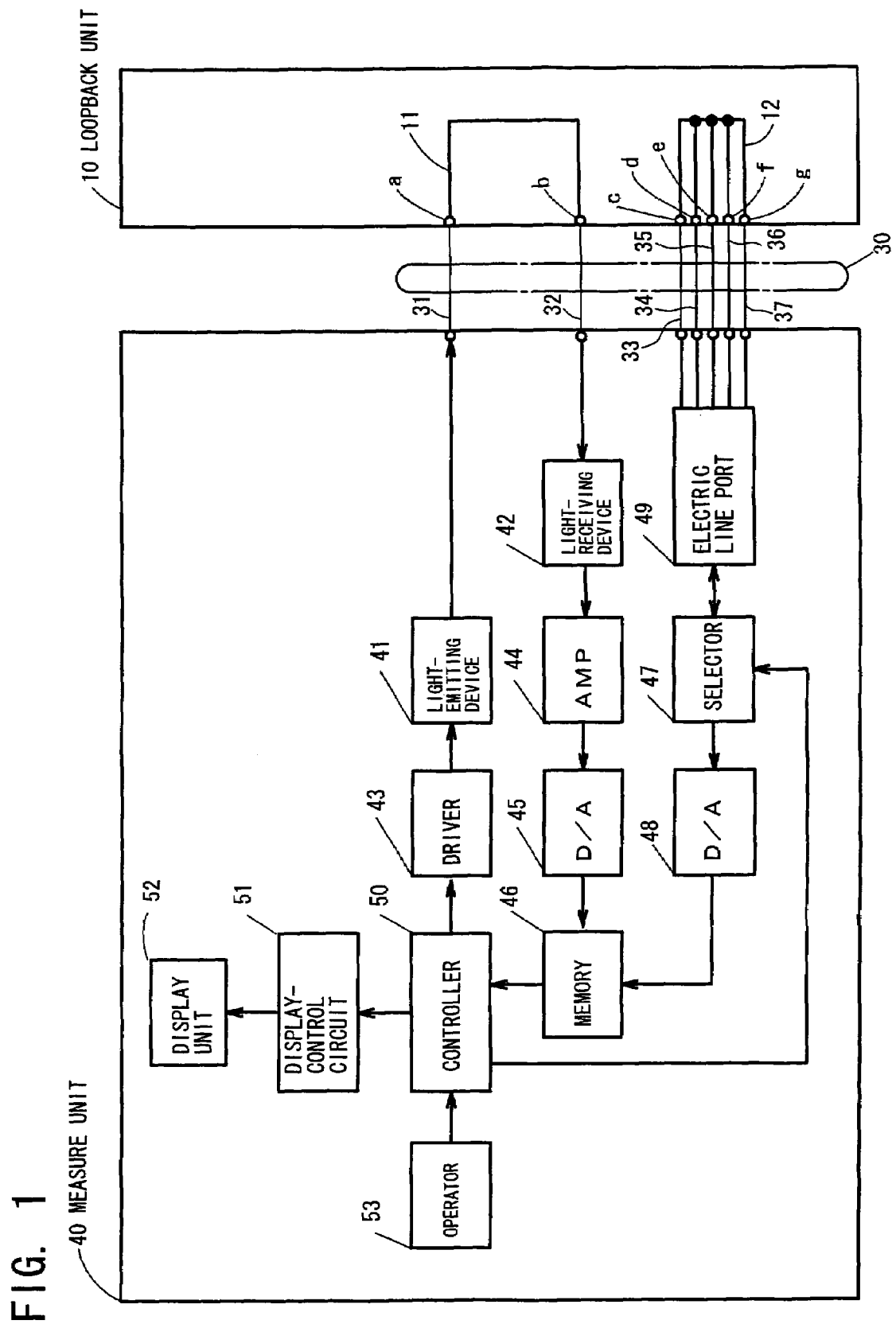
FIG. 1 is an electric block diagram showing structure of a detector detecting transmission performance of optical composite cable according to an embodiment of the present invention.

Embodiments of the present invention will next be described based on concrete examples. The scope of the present invention, however, is not limited to the embodiment described below.

A detector detecting transmission performance of optical composite cable comprises a loopback unit 10 as a first unit and a measure unit 40 as a second unit. The loopback unit 10 comprises an optical loop part, or a loop fiber 11 which connects an end 'a' of a first optical fiber 31 and an end 'b' of a second optical fiber 32. The loopback unit 10 comprises a short-circuit part, or a short-circuit wiring 12, which short-circuits the ends c and d of a pair of signal lines 33 and 34, the ends e and f of a pair of signal lines 35 and 36, and the end g of a shield line 37.

An optical composite cable 30 comprises the first optical fiber 31, the second optical fiber 32, the pair of signal lines 33 and 34, the pair of signal lines 35 and 36, and the shield line 37.

The measure unit 40 comprises a light-emitting device 41 which outputs pulse optical signal to the first optical fiber 31, and a light-receiving device 42 which receives pulse optical signal reflected by the loopback unit 10. The light-emitting device 41 is driven by a driver 43. A controller 50 comprises MPU and outputs control signal to the driver 43. Optical signal received by the light-receiving device 42 is amplified by an amplifier 44, the amplitude value is converted by a D/A converter 45 into digital signal and is stored by a memory 46. According to the command from the controller 50, a selector 47 selects one pair of lines from 5 electric lines: a pair of signal lines 33 and 34; a pair of signal lines 35 and 36; the signal line 33 and the shield line 37; the signal line 34 and the shield line 37; the signal line 35 and the shield line 37; or the signal line 36 and the shield line 37. The selector 47 supplies constant amount of electric current to one of the selected lines through an electric line port 49, and outputs terminal voltage of the other line to the D/A converter 48. The D/A converter 48 converts the terminal voltage into digital value and stores the value in the memory 46.

The controller 50 checks quantity of transmission loss of the optical fiber and breaking of the electric lines according to the value memorized in the memory 46. The result is shown by a liquid crystal display unit through a display-control circuit 51. The controller 50 receives command to start measurement or command to measure calibration from an operator 53. A housing of the measure unit 40 has structure shown in FIGS. 2A and 2B, and a housing of the loopback unit 10 has structure shown in FIGS. 3A and 3B.

A housing 70 formed in a rectangular column shape comprises each device shown in a block view of FIG. 1. On the front plane of the housing 70, a liquid crystal display screen 72 constructing the display unit 52 and push-button switches 74 constructing the operator 53 are installed. These push-button switches 74 allows the housing 70 to send command to start measurement or command to start calibration. Also, a connector 71 which is connected to a connector in the optical composite cable is formed at one end of the housing 70, and a dust cap 73 is disposed to protect the connector 71.

As shown in FIGS. 3A and 3B, the loopback unit 10 comprises a housing 80 formed in a rectangular column shape and a connector 81 which is formed at one end of the housing 80 and is connected to a connector of the optical composite cable. And a dust cap 83 is disposed to protect the connector 81.

Accordingly, the detector detecting transmission performance of optical composite cable of the present invention has structure as explained above.

A transmission loss measuring part of the present detector comprises the controller 50, the driver 43, the light-emitting device 41, the light-receiving device 42, the amplifier 44, the D/A converter 45, and the memory 46. A resistivity measuring part of the present detector comprises a electric line port 49, a selector 47, a D/A converter 48, a memory 46, and a controller 50. A disconnection detecting part comprises the controller 50. And a display part comprises the display-control circuit 51 and he display unit 52.

Next, actions of the detector of the present invention are explained hereinafter.

First, the measure unit 40 and the loopback unit 10 are connected directly with each other through connectors 71 and 81, respectively. And measurement is started by operating the push-button switch 74 of the operator 53. Transmission loss X between ends of a pair of optical fiber 31 and 32 and six resistivity values Y1 to Y6 in total, or resistivity Y1 between ends of a pair of signal lines, resistivity Y2 between ends of a pair of power supply lines, resistivity Y3 between ends of one signal line and the shield line, resistivity Y4 between ends of the signal line and the shield line, resistivity Y5 between ends of one power supply line and the shield line, and resistivity Y6 between ends of the other power supply line and the shield line, are measured and stored. Because the measure unit 40 and the loopback unit 10 are connected directly with each other, there is no optical fiber, signal line, and power supply line between those units. The terms of the transmission loss and the resistivity values described above is defined on the supposition that those optical fibers, signal lines and power supply lines described above are existed.

Large value of transmission loss X represents soiled ferrule of the connector, so it needs to be cleaned. When transmission loss X is normal, the push-button switch 74 of the operator 53 is operated and that value is stored as calibration value. After calibration is finished, transmission loss displayed by the display unit 52 is 0 dB. Such calibration value can be maintained when power supply switch is off.

Next, an optical composite cable is installed between the loopback unit 10 and the measure unit 40 in order that its transmission performance is measured. By operating the push-button switch 74 of the operator 53, command to start measurement is given and transmission loss A between ends of optical fibers and the six resistivities R1 to R6 between ends of electric lines are measured.

True transmission loss W between ends of optical fiber is calculated by a formula A-X and is displayed at the display unit 52. When transmission loss W between ends of optical fiber is larger than the predetermined threshold Tw1, the display unit 52 displays sign "NG." That is, the display unit 52 shows sign of disconnection of optical fibers. When transmission loss W between ends of optical fiber is smaller than threshold Tw1 and larger than the predetermined threshold Tw2, which is smaller than threshold Tw1, the display unit 52 displays the sign showing that the ferrule of the connector is soiled.

True resistivities V1 to V6 between ends of electric lines are calculated by a formula subtracting the six resistivities Y1 to Y6 from measured values R1 to R6, respectively. V1 represents resistivity between ends of signal lines and V2 represents resistivity between ends of power supply lines. And shield line resistivity S can be calculated by the following formula:

When resistivity between ends of power supply lines is normal, $$S=(V5+V6-V2)/2 \qquad (1)$$

When resistivity between ends of power supply lines is abnormal, or when power supply lines are disconnected, $$S=(V3+V4-V1)/2 \qquad (2)$$

Here V1 represents true resistivity between ends of signal lines, V2 represents true resistivity between ends of power supply lines, V3 represents true resistivity between ends of one signal line and the shield line, V4 represents true resistivity between ends of the other signal line and the shield line, V5 represents true resistivity between ends of one power supply line and the shield line, and V6 represents true resistivity between lines of the other power supply line and the shield line.

When each of these values is larger than a certain threshold, it is judged that disconnection occurs. The liquid crystal display unit shows disconnection status of the signal lines, the power supply lines, and the shield line.

In case that the power supply lines are normal, resistivity of the shield line is calculated by using the formula (1) when resistivity between ends of power supply lines is normal. Because the power supply lines are thicker and have smaller resistivity than the signal lines, extremely precise value of resistivity of the shield line can be obtained by using the formula (1).

In the present invention, transmission loss between ends of optical fibers and respective resistivities between ends of each electric lines are determined by employing average value of 4 times of measurements each measured at 10 msec, respectively.

INDUSTRIAL AVAILABLENESS

The present invention can be employed as a tester for an optical composite cable, or a composite cable comprising optical fiber and electric line, which connects a TV camera and a relay car to telecast from outdoor. The tester of the present invention enables to detect disconnection or status of transmission of the optical composite cable as an extremely light portable device.

The present invention has been described in detail with reference to the above embodiments serving as most practical and appropriate examples. However, the present invention is not limited to these embodiments, and appropriate modifications and applications can be made without deviating from the scope of the present invention.

While the present invention has been described with reference to the above embodiments as the most practical and optimum ones, the present invention is not limited thereto, but may be modified as appropriate without departing from the spirit of the invention.

The present invention comprises all the contents in the priority claiming Japanese patent application No. 2005-86710.

The invention claimed is:

1. A detector detecting transmission performance of optical composite cable which comprises optical fibers and electric lines, comprising:

a first unit which is connected to a connector formed at one end of said optical composite cable and comprises a optical loop part connecting a first optical fiber and a second optical fiber and a short-circuit part which short-circuits plural electric lines in said optical composite cable; and a second unit comprising a transmission loss measuring part, which is connected to a connector formed at the other end of said optical composite cable and measures transmission loss between ends of said first optical fiber and said second optical fiber returned by said optical loop unit, a resistivity measuring part, which measures resistivity between ends of electric lines returned by said short-circuit part, a disconnection detecting part, which detects connection or disconnection of electric lines by using measured resistivity, and a display part, which displays the result of transmission loss measured by said transmission loss measuring part and connection or disconnection detected by said disconnection detecting part.

2. A detector detecting transmission performance of optical composite cable according to claim 1, wherein said electric lines comprise a pair of signal lines and a pair of power supply lines and a shield line, said resistivity measuring part measures resistivity between ends of a pair of signal lines returned from said short-circuit part, resistivity between ends of a pair of power supply lines returned from the short-circuit part, and each resistivity between each ends of each signal line and said shield line returned from the short-circuit part, each resistivity between each end of each power supply line and said shield line returned from the short-circuit part, and said disconnection detecting part detects each disconnection status of the signal line, the electric line, and the shield line according to those measurement results.

3. A detector detecting transmission performance of optical composite cable according to claim 2, wherein said transmission loss measuring part outputs a pulse optical signal to the first optical fiber and receives the pulse optical signal from the second optical fiber synchronizing with sending said pulse optical signal.

4. A detector detecting transmission performance of optical composite cable according to claim 1, wherein said transmission loss measuring part outputs a pulse optical signal to the first optical fiber and receives the pulse optical signal from the second optical fiber synchronizing with sending said pulse optical signal.

* * * * *